March 28, 1939.                D. BUCCICONE                 2,151,831
                                SHAFT ATTACHMENT
                              Filed Dec. 14, 1937
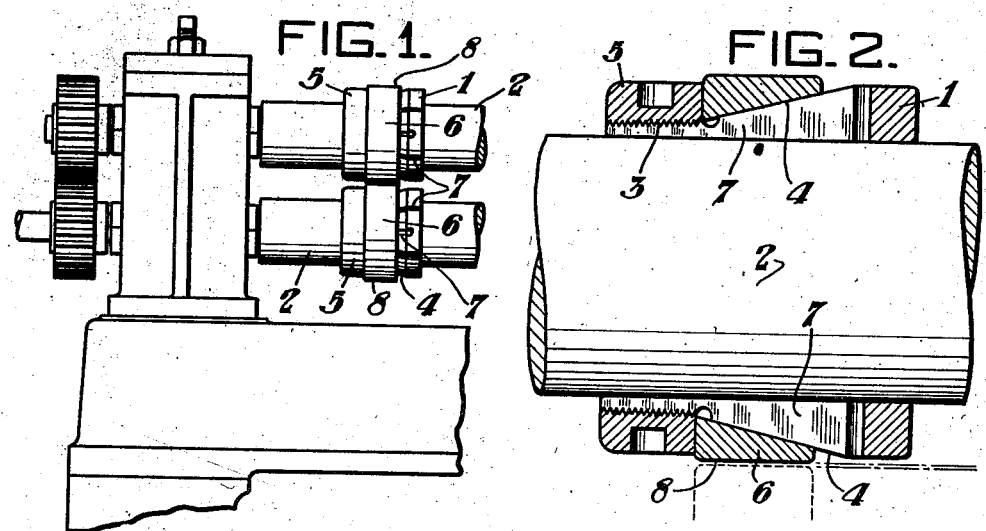
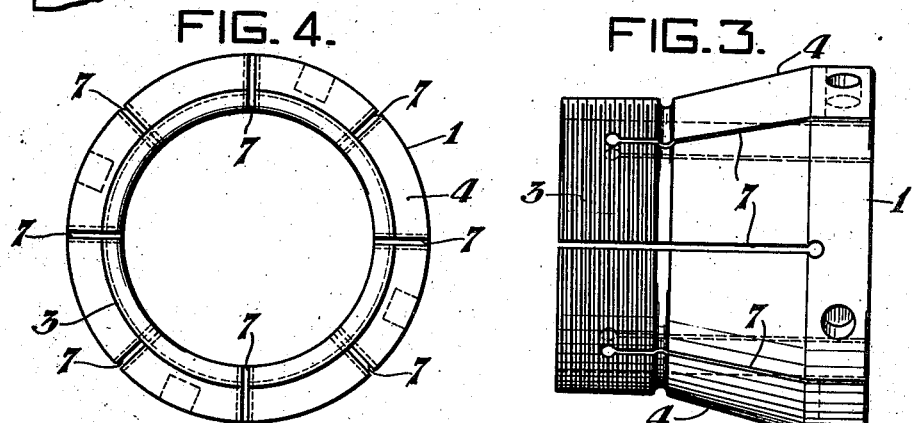
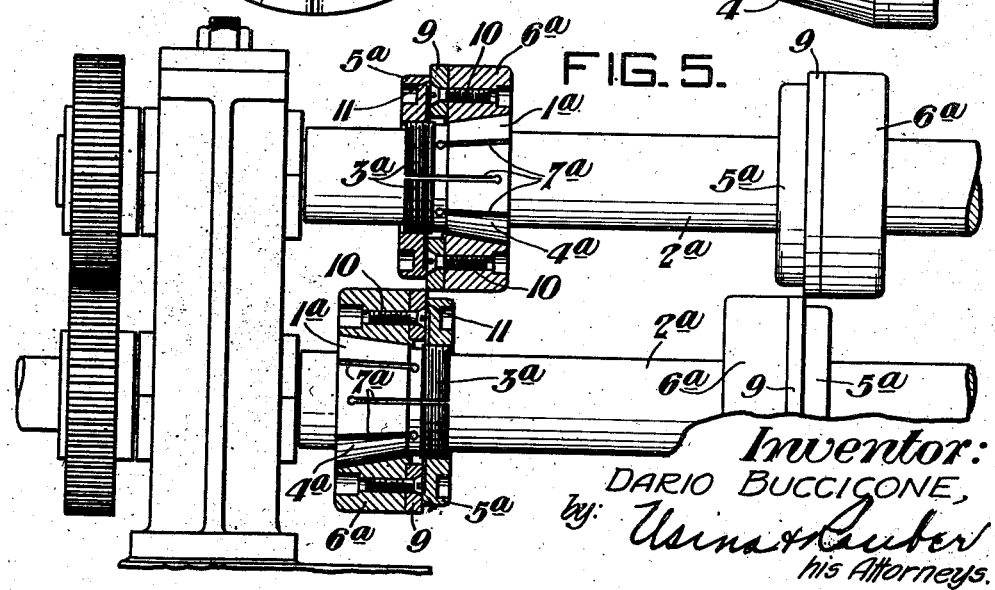
Inventor:
DARIO BUCCICONE,
by: Usina & Gruber
his Attorneys.

Patented Mar. 28, 1939

2,151,831

UNITED STATES PATENT OFFICE 2,151,831

SHAFT ATTACHMENT

Dario Buccicone, Gary, Ind.

Application December 14, 1937, Serial No. 179,768

5 Claims. (Cl. 164—70)

This invention is a shaft attachment intended to provide a means for mounting a rotary tool or other device on a shaft in positively concentric relationship with the same.

The attachment is illustrated by the accompanying drawing, in which:

Figure 1 shows a fin masher embodying the invention.

Figure 2 is a sectional enlargement from Figure 1.

Figure 3 shows a detail from Figure 2 in elevation.

Figure 4 is an end view of Figure 3.

Figure 5 shows a strip slitting shear embodying a modification of the invention.

As shown by the drawing, the attachment includes a contractible sleeve 1 for sliding on a shaft 2 and having an outside providing threads 3 and a taper 4 extending toward these threads. A nut 5 is screwed on the threads 3 and a ring 6 slides on the taper 4, the nut connecting with the ring by reason of being in direct contact, whereby screwing of the nut tightens or loosens the sleeve about the shaft 2.

Preferably, the sleeve 1 is made to rather closely fit the shaft 2 or any other shaft for which it is intended, although it should be capable of sliding easily over the same. The material from which it is made should be elastic, such as steel, the sleeve being longitudinally slotted, as at 7, for a majority of its length alternately from opposite ends at a plurality of circumferentially spaced positions. It follows that when the nut is unscrewed to permit the ring 6 to be released from the taper 4 the sleeve will expand automatically so as to be easily removed, easy application also accruing.

In the interests of easy action, the taper 4 should be conical, and the ring 6 should have a conical interior taper fitting the taper 4. For the same reason the abutting surfaces of the nut and ring should be smoothly finished so that the nut can be easily turned without turning the ring. Radial holes are shown in the circumferential surface of the nut 5 to permit the application of a suitable spanner.

Due to the sleeve 1 fitting very closely the shaft for which it is intended no trouble will be experienced in the way of thread disengagement during the normal use of the attachment. However, if desired, the threads may be tapered, as shown by the drawing, the taper being calculated to both take up looseness and prevent binding as the ring 6 performs its function.

The example that has been under discussion is a form of the attachment as used in the sheet and tin plate industry for mashing the fins on the edges of strip previously trimmed by a slitter. A suitable arrangement is shown by Figure 1.

In the case of the modification, substantially the same parts are used, the parts performing the same function as those already described being similarly numeraled but provided with the identifying letter a.

The difference in the modification is the screwing of a rotary knife 9 to the end of the ring 6ª, the latter being provided with a thicker wall to provide room for the screws 10 required for this purpose. This knife 9 is illustrated as positioned between the nut 5ª and ring 6ª, whereby the action of the nut in fastening the attachment to the shaft performs the further function of reenforcing the positioning of the knife, the latter being then clamped between the ring and nut.

Absolute concentricity of either the fin-mashing surface 8 or the rotary knife 9 respecting the mounting shaft is positively maintained, the various annular parts involved being concentric. Obviously this concentricity is maintained at all times and cannot be disturbed no matter how carelessly the attachment is installed, provided the nut is tightened.

Equivalent arrangements to what is specifically described may be possible, but the exact construction shown by the drawing is deemed preferable.

Modifications in the way of improvements are also to be expected, one possibility being the heretofore unmentioned annular projection 11 extending from the nut 5ª toward the knife 9 and functioning to reduce the bearing surface area and consequently the friction, during rotation of this nut respecting the knife and its mounting ring 6ª.

I claim:

1. A shaft attachment including a contractible sleeve for sliding on a shaft and having an outside providing threads and a taper extending toward said threads with a nut screwed on the latter and a ring sliding on the former and connecting with said nut, whereby screwing of said nut tightens or loosens said sleeve about a shaft, said sleeve being made of spring metal and being longitudinally slotted for a majority of its length alternately from opposite ends at a plurality of circumferentially spaced positions.

2. A shaft attachment including a contractible sleeve for sliding on a shaft and having an outside providing threads and a taper extending toward said threads with a nut screwed on the latter and a ring sliding on the former and connecting with said nut, whereby screwing of said nut tightens or loosens said sleeve about a shaft, said sleeve being made of spring metal and being longitudinally slotted for a majority of its length alternately from opposite ends at a plurality of circumferentially spaced positions, the various annular parts being concentric and said ring carrying a rotary tool, the latter being positively positioned in true concentricity with the shaft to which the attachment is applied.

3. A shaft attachment including a contractible sleeve for sliding on a shaft and having an outside providing threads and a taper extending toward said threads with a nut screwed on the latter and a ring sliding on the former and connecting with said nut, whereby screwing of said nut tightens or loosens said sleeve about a shaft, said threads being tapered so that the threading action between the same and said nut remains constant during contraction of said sleeve.

4. A shaft attachment including a contractible sleeve for sliding on a shaft and having an outside providing threads and a taper extending toward said threads with a nut screwed on the latter and a ring sliding on the former and connecting with said nut, whereby screwing of said nut tightens or loosens said sleeve about a shaft, said sleeve being made of spring metal and being longitudinally slotted for a majority of its length alternately from opposite ends at a plurality of circumferentially spaced positions, the various annular parts being concentric and said ring carrying a rotary tool, the latter being positively positioned in true concentricity with the shaft to which the attachment is applied, said tool being clamped between said ring and nut.

5. A shaft attachment including a contractible sleeve for sliding on a shaft and having an outside providing threads and a taper extending toward said threads with a nut screwed on the latter and a ring sliding on the former and connecting with said nut, whereby screwing of said nut tightens or loosens said sleeve about a shaft, said sleeve being made of spring metal and being longitudinally slotted for a majority of its length alternately from opposite ends at a plurality of circumferentially spaced positions, the various annular parts being concentric and said ring carrying a rotary tool, the latter being positively positioned in true concentricity with the shaft to which the attachment is applied, said tool being clamped between said ring and nut, and the latter having a longitudinally extending annular projection bearing against said tool so as to reduce frictional restraint to relative rotation of said nut respecting said tool.

DARIO BUCCICONE.